UNITED STATES PATENT OFFICE.

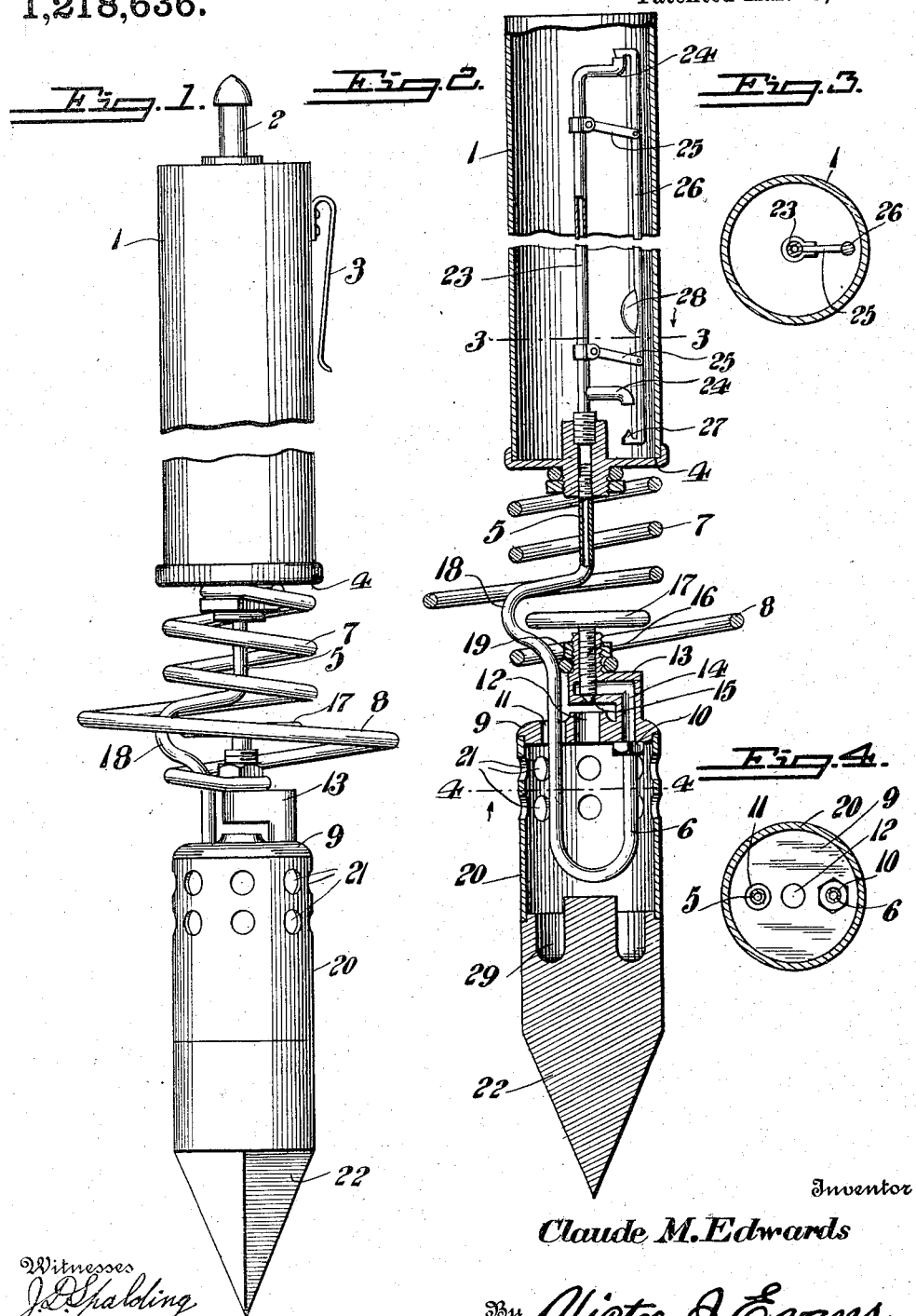

CLAUDE M. EDWARDS, OF GALVESTON, TEXAS.

SOLDERING IRON OR COPPER.

1,218,636.   Specification of Letters Patent.   Patented Mar. 13, 1917.

Application filed May 3, 1916. Serial No. 95,158.

*To all whom it may concern:*

Be it known that I, CLAUDE M. EDWARDS, a citizen of the United States, residing at Galveston, in the county of Galveston and State of Texas, have invented new and useful Improvements in Soldering Irons or Coppers, of which the following is a specification.

This invention relates to a self heating oil or gas soldering iron or copper adapted to be used in connection with natural or manufactured gas, crude or refined oil, preferably gasolene, and it consists in the novel features hereinafter described and claimed.

An object of the invention is to provide an iron of the character indicated especially adapted to be easily and conveniently used by linemen for repairing and connecting telegraph and telephone wires, and also for performing other work upon poles or about the switch boards of electric systems.

In the accompanying drawing:—

Figure 1 is a side elevation of the soldering iron or copper.

Fig. 2 is a longitudinal sectional view of the same.

Fig. 3 is a transverse sectional view of the same cut on the line 3—3 of Fig. 2.

Fig. 4 is a similar view cut on the line 4—4 of Fig. 2.

The soldering iron or copper includes a tank 1 which is of any desired shape and which is of cylindrical configuration. A valve nipple 2 is connected with one end of the tank 1 in any suitable manner. A clip 3 of spring metal, is attached to the side of the tank 1 and this may be used for suspending the iron from the belt of an operator, or for hanging the same upon wires or other supports when the device is not in use.

A head 4 is attached to one end of the tank 1 and closes the same. One end of a pipe 5 is connected with the head 4 and the said pipe is provided at its other end portion with a loop 6. A coiled rod 7 is connected at one end with the head 4 and extends along the major portion of the length of the pipe 5 and its convolutions surround the same. The said rod 7 is provided with an intermediate enlarged convolution 8. The end of the loop 6 is connected with a head 9 by means of a nut 10 or any other suitable securing device. The lower intermediate portion of the pipe 5 passes through an opening 11 provided in the head 9 and the walls of the opening 11 are spaced from the sides of the pipe 5 thereby providing room for the admission of some air into the shell which is connected with the head 9 as hereinafter described. The head 9 is also provided with a central opening 12. A nipple 13 is formed integrally with the head 9 and the said nipple is provided with a passage 14 with which one end of the loop 6 communicates. The nipple 13 is provided at its end portion with an outlet opening 15 which is disposed in alinement with the center of the opening 12 in the head 9. A valve 16 is screwthreaded in the nipple 13 and normally closes the opening 15 of the said nipple. The said valve 16 is provided with a handle 17 one edge portion of which is received in a bowed section 18 provided at the intermediate portion of the pipe 5. That end of the rod 7 which is connected with the head 9 is attached to the nipple 13 thereof by means of a nut 19 which is screwthreaded upon that part of the said nipple which receives the shank or stem of the valve 16. A cylindrical shell 20 is connected at one end with the head 9 and the said shell is provided at its sides with openings 21 through which the flame and heat may escape from the said shell. An iron or copper 22 is attached to that end of the shell 20 which is the more remote from the end which is connected with the head 9 and the said iron or copper closes the end of the shell to which it is connected.

A pipe 23 is located in the tank 1 and connected at one end with the head 4. The said pipe is in alinement with that end portion of the pipe 5 which is connected with the said head. The pipe 23 is provided in the vicinity of its opposite ends with laterally disposed branches 24, the said branches having openings disposed in opposite directions with relation to each other. Links 25 are pivotally connected at their inner ends with the pipe 23 in any suitable manner and a rod 26 is pivotally connected with the outer ends of the said links. The rod 26 carries at its ends valves 27 which are adapted to seat alternately or at different times upon the openings provided at the outer ends of the branches 24 whereby the opening of one of the said branches always remains unobstructed while the opening of the other branch may be closed by that valve 27 which is designed to seat upon the same. If desired a weight 28 may be mounted upon the intermediate portion of the rod 26.

In operation the device is used as follows: When oil or gasolene is used as a fuel the tank 1 is partially filled with the same and then by connecting an air pump with the nipple 2 in the usual manner the air is pumped into the tank 1 so that the liquid fuel contained therein is subjected to the pressure of the compressed air. The air may be supplied to the tank 1 by the use of an ordinary bicycle pump (not shown). The iron is then held in a vertical position and by turning the handle 17 the valve 16 is moved away from the opening 13 and thus the oil may pass from the tank 1 through the lowermost branch 24 into the pipe 23 then through the pipe 5 down and up along the loop 6 into the passage 14 of the nipple 13, thence through the opening 15 and the opening 12 in the head 9 into the shell 20 and lodges in a groove 29 which is provided at the inner end of the iron or copper 22. By inserting a match through one of the openings 21 the oil which is deposited in the groove 29 may be ignited. The said groove 29 serves as a priming pan for initially heating the portion of the pipe 5 and the loop 6 which are located in the shell 20. After these parts have been sufficiently heated to convert the oil which is passing through the same into a gas the flame is automatically transferred from the groove 29 to the gas as it emerges from the opening 15 and passes through the opening 12. Thus the portion of the pipe 5 and the loop 6 which are in the shell 12 are subjected to the heat from the flame which is coming through the opening 12 and the iron 22 is also heated. The excessive heat and flame may escape from the shell 20 through the openings 21. The arrangement of the branches 24 and their outlets is such that the outlet of one of the said branches always remains unobstructed and open irrespective of the position or inclination of the tank 1. If the tank 1 is turned so that the head 4 is at the lower end thereof the rod 26 moves by gravity to the position shown in Fig. 3 whereby the valve 27 at the upper end of the said rod 26 closes the opening of the uppermost branch 24 but the lowermost branch 24 will have its opening below the level of the oil or fuel in the tank 1 and consequently the oil will be forced by the air out through the lowermost branch 24 into the pipe 23. When the tank 24 is inverted in its position so that the head 4 is at the upper end thereof the rod 26 moves by gravity whereby the opening in the branch 24 which is nearest the head 4 is closed but the valve 27 of that branch 24 which is the more remote from the head 4 moves away from the opening of the said branch and consequently the oil may enter the pipe 23 through that branch 24 which is the more remote from the head.

When the device is not in use and should it be placed in an inclined position upon a bench or other support the enlarged convolution 8 will hold the heated copper or iron 22 away from the surface of the bench and thus prevent the said copper or iron from damaging the bench. Inasmuch as the convolutions of the rod 7 are spaced from each other sufficient air can enter in between the said convolutions to maintain the rod at a proper cool condition and the said rod will also prevent the transmission of heat from the head 9 to the head 4 of the tank 1. In view of the fact that the handle 17 is located approximately within the enlarged convolution 8 and in the bowed portion 18 of the pipe 5, the said handle is protected and the possibility of the same being accidentally turned is reduced.

From the foregoing description taken in conjunction with the accompanying drawing it will be seen that a soldering iron or copper of simple and durable structure is provided and the same may be easily and conveniently used in conjunction with manufactured gas or oil for the purpose of repairing wires or any other metal structure requiring soldering operation.

Having described the invention what is claimed is:—

An iron or copper comprising a tank, a pipe connected at one end with the tank, a head connected at the other end of the pipe, said head having a central opening, and a valve carried by the head and located in alinement with said opening, a coiled rod connected with the tank and the head, the said rod having an intermediate convolution which is of greater diameter than its terminal convolution; a shell connected with the head and a copper connected with the shell.

In testimony whereof I affix my signature in presence of two witnesses.

CLAUDE M. EDWARDS.

Witnesses:
VANDA L. EDWARDS,
S. M. FORSGARD.